Patented Nov. 28, 1939

2,181,765

UNITED STATES PATENT OFFICE 2,181,765

PRESERVATION OF ORGANIC SUBSTANCES

Sidney Musher, New York, N. Y., assignor to Musher Foundation Incorporated, New York, N. Y., a corporation of New York No Drawing. Application March 13, 1939, Serial No. 261,667

10 Claims. (Cl. 23—239)

This invention relates to the preservation of textiles, rubber, paper, hydrocarbon oils, glyceride oils, essential oils, and other organic materials by addition thereto of relatively small quantities of the water soluble starch and fiber free carbohydrate containing extract of finely divided raw, unbleached, dry milled maize or oats.

An object of this invention is the stabilization of organic materials against oxidative deterioration.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, the water soluble, carbohydrate and phosphorous containing fiber and starch free extract of maize or oat flour is prepared, and most desirably using maize, such flour being finely divided, dry milled and raw or unbleached. The cereal may be dehulled but for normal commercial manufacture, the hulls or skin may be allowed to remain as part of the cereal for extraction. The raw and unbleached by-products from the normal milling of the maize or oats may much less desirably be employed for extraction purposes.

The raw and unbleached, dry milled, finely divided maize should be mixed or agitated thoroughly with a quantity of water for a period of about 30 minutes at a temperature of 135° F. The time of agitation may vary from 5 minutes to 1 hour but in order to obtain the maximum yield and the most desirable product, the time period for continuous agitation should be between about 20 minutes and 40 minutes.

The temperature of the water at the time of the extraction should not be in excess of about 140° F. to 145° F. in order to avoid solubilization and gelatinization of the starch, both of which are highly undesirable in the production of the desired extract. The water temperature should also not be less than about 125° F. to 130° F., although slightly lower temperatures may be employed, in order to obtain the maximum yield of the water soluble anti-oxygenic substances. A difference of as little as 10° in the temperature of the water used for extraction may account for a 50% to 75% loss in the yield of the water extract that is obtained and therefore the most suitable temperature of the water for extraction is about 135° F.

The water used should be substantially free of minerals and desirably free of iron and copper. Where the water normally has a pH above 7.0, it should be acidified to reduce the pH. Preferably, in order to obtain a clear supernatant water containing the extract, and to obtain the most desirable type of extract, the pH of the water should be adjusted to 5 to 6.7 and preferably to 6 by addition of a mineral acid such as hydrochloric, sulphuric or phosphoric, or an organic acid such as acetic, tartaric, citric, etc., or by the addition of acid salts such as acid sulphates or phosphates. This adjustment may take place during or before the extraction. The maize flour may be agitated in the water at 135° F. for the 30 minute period. The pH adjustment will also serve to increase the rate at which insoluble material will settle out leaving a clear supernatant water portion containing the extract.

Any quantity of water may be used to produce a free flowing mixture. One part of maize should preferably be mixed with 9 parts of water by weight. Other proportions may also be used such as from 6 to 15 parts of water to every 1 part of maize flour.

Another very satisfactory method is for the maize or other cereal to be ground or milled with sufficient water to produce a paste and whereby the cell structure of the cereal is so broken into as to permit the maximum solubility of the water extractable substances into the water. Then the pulpy aqueous mass may be pressed or centrifuged or otherwise treated to remove the aqueous solution containing the extract. Preferably the same temperature and acidity are employed as above. The solution may be clarified or filtered or where additional water is added, allowed to settle out.

Where the maize-water suspension is allowed to stand for settling out, and after the 30 minute agitation and extraction period, the solution should desirably be cooled by placing it in a jacketed or coiled vat or by running water through cooling coils immersed therein or by adding cold water to the hot maize-water suspension, so that the temperature of the water is reduced from 135° F. to from 80° to 105° F. and preferably to about 100° F. in order to avoid fermentation during the settling period. The solution thus cooled may then be treated to remove the undissolved starch, fibrous and other cereal insoluble portions. This may be accomplished by allowing the solution to settle for from 2 to 12 hours until a substantially clear unfermented supernatant liquid is formed which liquid is removed by decanting, siphoning, or similar process.

The solution containing the maize may also be subjected to a continuous centrifuging whereby all undissolved material is removed as a continuous operation.

The substantially clear solution thus obtained should desirably be evaporated by vacuum distillation at 135° F under 25 inches of vacuum, to approximately 25% to 75% solids and desirably to about 50% solids and to a Baumé of 24°. After the proper solids content has been reached, the extract should desirably be subjected to superheated steam in the vacuum pan in order to raise the temperature of the extract to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated extract may be packed in cans or other containers and sterilized at 220° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will avoid, to a large degree, such precipitation and coagulation.

This water extract of finely divided, dry milled, raw and unbleached maize at a Baumé of 20° and even up to a Baumé of 40° containing from 30% to 60% total solids is a light colored, bland, substantially odorless and flavorless, free flowing material, such material containing both carbohydrates and phosphatides in water soluble form and such material capable of being used for addition to many products subject to oxidation without changing the normal characteristics of the product with which it is used. The extract is also substantially starch, fibre and oil free.

The water extract of whole pulverized oats is of dark brown or tan color, comparatively solid at 75° F. and liquid at 125° F. flowing freely at that temperature, but such extract having a much more pronounced odor and flavor than the maize extract and being less desirable for use as an anti-oxidant than the oat-water extract, particularly where color and flavor are factors.

There is, as indicated, a very substantial difference between the water extract obtained from oats and that obtained from maize insofar as appearance and general characteristics are concerned, although they both possess good anti-oxidant properties and are both substantially starch, fiber and oil free and contain water soluble carbohydrates, which carbohydrates are essential to the proper antioxidant activity particularly when subjected to elevated temperatures in the organic composition to be preserved.

It is not desirable to concentrate the water extract down to in excess of 70% solids in the vacuum pan, as otherwise darkening and caramelization of the extract occurs.

Where drying is desirable, the concentrated water extract may be dried on trays, preferably under vacuum and a desirable dried product will be obtained. Drum drying is difficult in view of the mucilaginous nature of the extract by means of which the extract adheres to the drum and cannot readily be scraped off. Spray drying may less preferably be resorted to in view of the oxidation occurring during the spray drying operation.

Where desired, a carrier may be employed in the drying of the concentrate. For example, the concentrated water extract may be mixed with condensed skim milk on the basis of using from 10% to 60% by weight of the extract (on its solids basis) against the solids weight of the skim milk and the thoroughly mixed combination of the concentrate and skim milk dried on a drum drier or otherwise dried. The skim milk absorbs the gummy characteristics of the concentrate and permits much easier drying than where the concentrate is dried alone. Other carriers may also be employed such as salt and sugar, for example, dependent upon the use to which the extract is eventually to be put.

It is more desirable for purposes of extraction to use either a dry milled maize product as the cereal for extraction although oats may also be used. Maize and oats will give an extract of substantially greater potency than the other cereals and the yield obtained will also be greater. In the case of oats, it is preferable to use finely divided whole oats with its full content of oat groats and hulls rather than oat flour. There may also less desirably be utilized the oat middlings and hulls or other residuary products obtained during the milling of the oats.

The yield which is obtained which is an important consideration, will average between 8% and 11% on the solids basis provided the extraction of the maize-water is carried out at a temperature of about 135° F. for approximately 30 minutes, during which time the maize is agitated in the water suspension. Where the temperature of the water is dropped to below 130° F., the yield will very materially be decreased, dropping as low as 3% to 6% on the solids basis. At the same time the water temperature should not exceed 140° F. in order to avoid solubilization and gelatinization of the starch. Where solubilization occurs first, the yield will naturally be increased but the effectiveness of the extract will be decreased. Where gelatinization occurs, naturally, the supernatant water portion containing the water soluble extract cannot be readily removed and the yield will be materially lessened.

The supernatant water portion of a maize-water mixture is considerably clearer than that produced when the oat cereal is extracted, and particularly where clarity of the finished concentrate is desired, dry milled, finely divided, raw maize should be employed in preference to oats.

The extract may very desirably be mixed with milk, preferably skimmed, in concentrated form, and using from 10% to 60% of the extract and 90% to 40% of the milk, based on the solids weight, and then drying the ingredients together, whereby there is obtained a combined action of the milk sugar and milk phospholipin in the skim milk to further increase the stabilizing action of the oat or maize water extract. The drying may be done preferably on a hot roll and the dried film scraped off after drying. Less preferably the mixture may be dried by spraying into a heated chamber.

Where a completely water soluble dried product is desired, the extract may be mixed with powdered or crystallized salt or sugar using from 5% to 40% of the extract and 95% to 60% of the salt or sugar and preferably applying the concentrated extract to the sugar or salt crystals by spraying such extract on the crystals while they are kept at above 180° F. and desirably at between 250° F. and 300° F. so that the extract dries on the surface of the crystals of the salt or sugar.

For example, as the salt crystals leave the kiln at 275° F., the extract of oats containing 50% water may be heated to 170° F. and sprayed on the salt crystals, applying 15% on the solids basis to the salt in this manner, thereby obtaining a completely soluble product. In all cases the final extract should be free of starch, and cereal fibres.

The maize or oats should be extracted only once as subsequent extractions will not remove preservative materials satisfactory for use.

The extract which contains the water soluble carbohydrate material together with a portion of the water soluble nitrogenous products and a small amount of phosphorous containing materials is substantially free of pro-oxidants normally present in the original cereal and which pro-oxidants reduce materially the antioxygenic activity of that cereal.

The cereals utilized in accordance with this invention contain less than 0.75% total lecithin and generally less than 0.5%. The preservative effect obtained is quite different than that obtained with lecithin. Lecithin, for example, is substantially inactivated as an antioxidant when heated to 65° C. whereas this water extract retains its full antioxidant properties at temperatures far in excess of 65° C. such as at 100° C. and even as high as 250° C. where it becomes even more effective when heated in the organic composition to be preserved. These cereals used for water extraction should also have a low oil content of less than 7% and usually under 5% and are not used for commercial extraction or expression of oil.

The concentrated maize extract obtained in accordance with this invention has wide antioxygenic properties and may be satisfactorily used for the preservation of organic materials subject to oxidative deterioration.

For example, the concentrated water extract may be added to sizing baths used for the sizing of textiles, paper, paper board, and similar products where they either contain natural oils or other organic materials subject to oxidation or where such oxidizable organic materials are added to them during processing or sizing. The extract may be satisfactorily used for curing operations such as a part of the curing ingredients in the curing of hides, bones, fishery products such as herring, mackerel, salmon, etc., and in the curing of meat products such as bacon, hams, etc. The extract is beneficial for retarding blood oxidation of haemoglobin to maethmoglobin wherein it may be added to sausage, hamburgers, etc. The extract may also be used in the dairy industry as for addition to milk, cream, ice cream, cream in the manufacture of butter, etc.; for addition to organic compositions containing glycerides, essential and hydrocarbon oils subject to oxidation; in the curing of fruit products and also for canned and frozen fruits to retard oxidative deterioration and discoloration thereof; for fortifying cereals, starches, cereal grasses such as alfalfa in order to increase the antioxygenic value of such cereals and cereal grasses for whatever purposes they may be employed as well as to retard loss of carotene and vitamin A therein; for use in the manufacture of puddings and desserts, in the quenching of coffee, etc.

Less than 5% of the water soluble extract on its solids basis will generally give the desired preservative effect and in most instances less than 2% of the extract will be sufficient. The extract should desirably be thoroughly dispersed throughout the body of the organic product to be stabilized.

It has been particularly found that where the water extract of maize, for example, is added to an organic material subject to oxidation and that organic material containing the extract thoroughly dispersed therein subjected to an elevated temperature such as to in excess of 150° F. and preferably in excess of 250° F. a marked acceleration or increase in preservative effect will be obtained. For this reason, it is desirable for the water extract to be added to the organic material, thoroughly dispersed therein and then to subject the organic material to an elevated temperature in order to more markedly develop the preservative effect.

It is not known exactly how this mechanism occurs, but it is considered that the carbohydrates present in the extract play an important part in the development of the markedly accelerated and preservative action under the conditions of heat treatment.

For example, where ground wood made of pine stock is used in the manufacture of paper board and which ground wood is rapidly subject to the development of off odors during storage of the finished paper board, this can be substantially avoided by adding a relatively small amount of the concentrated water extract of maize to the basis stock and then subject the stock containing the extract to a treatment of between 230° F. and 260° F. whereby the normal preservative effect of the extract will be materially enhanced and far greater preservative effects will be obtained than if such heat treatment were not given.

Where the water extract has been dried with a carrier or filler such as with skim milk, sugar, salt, or similar products and the combination is added to an organic composition and heated, a similar increase in preservative antioxygenic effect will be obtained.

For the purpose of this invention, concentrated maize extract is by far the most desirable in view of the nature of the extract that is obtained, although the oat extract may also be employed.

Other cereals such as barley, wheat or rye may be subjected to water extraction, but these are far less preferable from the standpoint of their preservative action and from the standpoint of their general use as antioxygenic preservative materials.

These water soluble antioxygens are contained in the normally low temperature water soluble component of the non-oil portion of the cereals, namely, the meal portion of the cereals which are preferably degerminated before being made into flour.

This component is substantially free of gelatinized, liquefied, solubilized or converted starch and desirably will not give a positive starch iodine test.

These antioxygens are substantially oil free and fibre free.

The complex antioxygen mixture contains water soluble sugars as well as water soluble organic nitrogen and phosphorous compounds and the activity of the water soluble antioxygens embedded in the meal portion of the unbleached cereal flours and particularly in the unbleached maize and oat flour is apparently greatly increased and enhanced by removal of the starch and water insoluble portions of the flours, such increase and enhancement being to a substantially greater degree than would be expected to result from a mere concentration of the antioxygens. The sugars extracted from the flour are usually present in minor proportion, below 50%.

By "low temperature" used in the specification and claims is meant a temperature at or above room temperature and below about 135° F. to 145° F. above which the starch gelatinizes and solubilizes.

The present application is a continuation in part of applications, Serial No. 799 filed January 7, 1935; Serial No. 15,307 filed April 8, 1935; Serial No. 233,027 filed October 3, 1938; Serial No. 255,775 filed February 10, 1939; and Serial No. 268,766 filed April 19, 1939. The present application differs from these latter applications in specifically claiming the process of making the starch and fibre free water soluble antioxygens extracted with water preferably slightly acidified and at a lower temperature from unbleached and unleached antioxygenic cereal flours.

Having described my invention, what I claim is:

1. A process of segregating water soluble antioxygens containing water soluble carbohydrates and organic nitrogen and phosphorous compounds from finely divided unbleached and unleached cereal flours selected from the group consisting of oats, maize and barley, which comprises mixing said cereals with water having a pH between about 5 and 6.7 and at a temperature of above about 125° F. and below about 145° F., removing the undissolved residue, and then concentrating the resultant starch and fibre free liquor, whereby there is obtained said water soluble antioxygens suitable for addition to organic compositions subject to oxidative deterioration to retard oxidative deterioration thereof.

2. As an antioxidant, the substantially starch and fibre free antioxygens extracted from unbleached and unleached cereal flours selected from the group consisting of oats, maize and barley and containing water soluble carbohydrates and organic nitrogen and phosphorous compounds, said antioxygenic extract being produced according to the process of claim 1.

3. A process of segregating water soluble antioxygens containing water soluble carbohydrates and organic nitrogen and phosphorous compounds from finely divided unbleached and unleached antioxygenic cereal flours, which comprises mixing said cereals with an aqueous extracting medium having a pH between about 5 and 6.7 and at a temperature of above about 125° F. and below about 145° F. and removing the undissolved residue, whereby there is obtained said water soluble antioxygens suitable for addition to organic compositions subject to oxidative deterioration to retard oxidative deterioration thereof.

4. As an antioxidant, the substantially starch and fibre free antioxygens extracted from unbleached and unleached antioxygenic cereal flours and containing water soluble carbohydrates and organic nitrogen and phosphorous compounds, said extract being produced according to the process of claim 3.

5. A process of segregating water soluble antioxygens containing water soluble carbohydrates and organic nitrogen and phosphorous compounds from finely divided unbleached and unleached cereal flours selected from the group consisting of oats, maize and barley, which comprises mixing said cereals with water having a pH between about 5 and 6.7 and at a temperature of above about 125° F. and below about 145° F. and removing the undissolved residue, whereby there is obtained said water soluble antioxygens suitable for addition to organic compositions subject to oxidative deterioration to retard oxidative deterioration thereof.

6. As an antioxidant, the substantially starch and fibre free antioxygens extracted from unbleached and unleached cereal flours selected from the group consisting of oats, maize and barley and containing water soluble carbohydrates and organic nitrogen and phosphorous compounds, said antioxygenic extract being produced according to the process of claim 5.

7. A process of segregating water soluble antioxygens containing water soluble carbohydrates and organic nitrogen and phosphorous compounds from comminuted unbleached and unleached maize, which comprises mixing said maize with water having a pH between about 5 and 6.7 and at a temperature of above about 125° F. and below about 145° F. and removing the undissolved residue, whereby there is obtained said water soluble antioxygens suitable for addition to organic compositions subject to oxidative deterioration to retard oxidative deterioration thereof.

8. As an antioxidant, the substantially starch and fibre free antioxygens extracted from unbleached and unleached comminuted maize and containing water soluble carbohydrates and organic nitrogen and phosphorous compounds, said antioxygenic extract being produced according to the process of claim 7.

9. A process of segregating the water soluble antioxygens containing water soluble carbohydrates and organic nitrogen and phosphorous compounds from the unbleached and unleached cereal flours and eliminating the starch and fibrous materials contained in said cereal flours, which comprises mixing 1 part of said flours with approximately 9 parts by weight of water, said water having been adjusted to a pH of about 6, and said mixing being conducted at a temperature of about 135° F. for about 30 minutes, removing the undissolved cereal, starch and fibrous materials before any fermentation has occurred, and concentrating the starch and fibre free liquor under vacuum to about 70% total solids, whereby there is obtained the water soluble antioxygenic materials suitable for addition to organic compositions subject to oxidative deterioration to retard oxidative deterioration thereof.

10. A process of segregating the water soluble antioxygens containing water soluble carbohydrates and organic nitrogen and phosphorous compounds from unbleached and unleached dry-milled maize flour and eliminating the starch and fibrous materials contained in said maize flour, which comprises mixing 1 part of said maize flour with 9 parts by weight of water, said water having been adjusted before extraction to a pH of about 6, and said mixing being conducted at a temperature of about 135° F. for about 30 minutes, removing the undissolved flour, starch and fibrous materials before any fermentation has occurred and concentrating the starch and fibre free liquor under vacuum to about 70% total solids, whereby there is obtained a light colored, bland, free flowing, water soluble antioxygenic material, and then mixing said material with a carrier for drying, said dried material being suitable for addition to organic compositions subject to oxidative deterioration.

SIDNEY MUSHER.